US010355590B2

(12) United States Patent
Kwak et al.

(10) Patent No.: US 10,355,590 B2
(45) Date of Patent: Jul. 16, 2019

(54) BOOST CONVERTER WITH PRE-CHARGE CURRENT

(71) Applicant: QUALCOMM Incorporated, San Diego, CA (US)

(72) Inventors: Taewoo Kwak, San Diego, CA (US); Joseph Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/632,879

(22) Filed: Jun. 26, 2017

(65) Prior Publication Data
US 2018/0375430 A1   Dec. 27, 2018

(51) Int. Cl.
| H02M 3/158 | (2006.01) |
| H02M 3/335 | (2006.01) |
| H02M 1/32 | (2007.01) |
| H02M 1/36 | (2007.01) |

(52) U.S. Cl.
CPC ............ *H02M 3/158* (2013.01); *H02M 1/32* (2013.01); *H02M 3/335* (2013.01); *H02M 1/36* (2013.01)

(58) Field of Classification Search
CPC ...... H02M 3/156; H02M 3/155; H02M 3/145; H02M 3/158; H02M 3/1588; H02M 3/157; H02M 3/1563; G05F 1/445; G05F 1/45
See application file for complete search history.

(56) References Cited

U.S. PATENT DOCUMENTS

| 6,265,854 | B1 * | 7/2001 | Neuteboom | H02M 3/1563 323/222 |
| 7,276,888 | B2 | 10/2007 | Thiele et al. | |
| 7,466,189 | B2 | 12/2008 | Sohara et al. | |
| 7,750,609 | B2 * | 7/2010 | Omi | H02M 1/36 323/222 |
| 7,977,926 | B2 | 7/2011 | Williams | |
| 9,337,733 | B2 | 5/2016 | Chen | |
| 2013/0249520 | A1 | 9/2013 | Oikarinen et al. | |
| 2013/0278239 | A1 | 10/2013 | Dong | |
| 2015/0194888 | A1 * | 7/2015 | Kasai | H02M 3/158 323/271 |
| 2016/0013718 | A1 | 1/2016 | Fifield et al. | |
| 2016/0065066 | A1 * | 3/2016 | Zhang | H02M 3/158 323/271 |

\* cited by examiner

*Primary Examiner* — Nguyen Tran
(74) *Attorney, Agent, or Firm* — Paradice and Li LLP/Qualcomm

(57) ABSTRACT

Method and apparatus is disclosed for providing a controlled pre-charging current for capacitive loads coupled to a boost converter. For at least some embodiments, the boost converter may include a high-side field effect transistor (FET) and a low-side FET. The boost converter may provide the pre-charge current by periodically enabling the high-side FET while the low-side FET is maintained in an off state. The high-side FET may be enabled by a square-wave signal. The pre-charge current may be delivered until the output voltage of the boost converter exceeds a reference voltage. After the output voltage exceeds the reference voltage, the boost converter may transition to a normal (switching) operation.

12 Claims, 5 Drawing Sheets

BOOST CONVERTER WITH PRE-CHARGE CURRENT

TECHNICAL FIELD

The present embodiments relate generally to power converters, and specifically to boost converters for use in portable electronic devices.

BACKGROUND OF RELATED ART

Portable electronic devices are often powered by one or more batteries. A switching power converter is often used to convert a battery voltage to a different output voltage for one or more sub-systems (e.g., loads) of the portable electronic device. Some loads may be powered by a voltage greater than the battery voltage. Under these conditions, the switching power converter may be a boost converter to generate an output voltage relatively greater than the battery voltage. In certain circumstances, operation of the boost converter may stress one or more components in the boost converter and/or may result in operation which is not at optimal efficiency. Thus, there is a need for improved boost converters.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed that may allow a boost converter to provide a pre-charge current to a load. An example boost converter is disclosed and may include an inductor comprising a first terminal and a second terminal, where the first terminal is coupled to an input terminal of the boost converter, a first field effect transistor (FET) configured to selectively isolate a second terminal of the inductor from a ground reference, a second FET configured to selectively isolate the second terminal of the inductor from an output terminal of the boost converter, and a controller configured to control the second FET to periodically isolate (or decouple) the second terminal of the inductor from the output terminal while the first FET isolates (or decouples) the second terminal of the inductor from the ground reference.

In another example, a method of operating a boost converter may include controlling, by a boost converter controller, a first field effect transistor (FET) to isolate a second terminal of an inductor from a ground reference, where a first terminal of the inductor is coupled to an input terminal of the boost converter, and controlling, by the boost converter controller, a second FET to periodically isolate the second terminal of the inductor from an output terminal of the boost converter.

In another example, a device is disclosed. The device may include a battery, a load, and a boost converter coupled to the battery and to the load. The boost converter may include an inductor comprising a first terminal and a second terminal, where the first terminal is coupled to the battery, a first field effect transistor (FET) configured to selectively isolate the second terminal of the inductor from a ground reference, a second FET configured to selectively isolate the second terminal of the inductor from the load, and a controller configured to control the second FET to periodically isolate the second terminal of the inductor from the load while the first FET isolates the second terminal of the inductor from the ground reference.

In another example, a boost converter is disclosed. The boost converter may comprise means for controlling a first field effect transistor (FET) to isolate a second terminal of an inductor from a ground reference, where a first terminal of the inductor is coupled to an input terminal of the boost converter, and means for controlling a second FET to periodically isolate the second terminal of the inductor from an output terminal of the boost converter. The means for controlling the first FET may cause the second terminal of the inductor to be isolated from the ground reference for at least a certain period of time. The means for controlling the second FET may cause the second terminal of the inductor to be periodically isolated from an output terminal of the boost converter during that same period of time. In some embodiments, this period of time extends for the length of a pre-charge mode.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Figure 1:
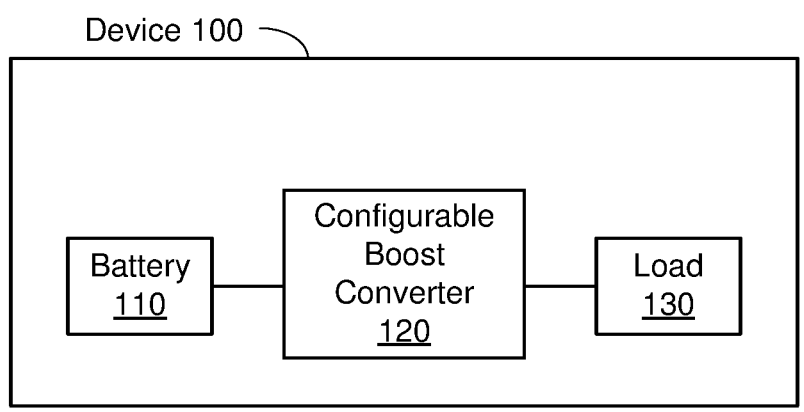
FIG. 1 is an example of a device within which example embodiments may be implemented.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 depicts an example device 100 within which example embodiments may be implemented. The device 100 may include a battery 110, a configurable boost converter 120, and a load 130. The example device 100 is illustrated with one battery 110, one configurable boost converter 120, and one load 130 for ease of explanation. In other embodiments, the device 100 may include any suitable number of batteries 110, configurable boost converters 120, and/or loads 130. In some aspects, the device 100 may be any technically feasible, battery powered electronic device. For example, the device 100 may be a wireless communication device such as a cell phone, personal digital assistant (PDA), laptop computer, or the like. The device 100 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some embodiments, the device 100 may include one or more processing resources (e.g., processors and/or ASICs) and one or more memory resources. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 4.

The battery 110 may be coupled to the configurable boost converter 120, which in turn may be coupled to the load 130. The battery 110 may be any technically feasible energy storage device. In some aspects, the battery 110 may store energy via a variety of chemical components that interact to release electrical current. For example, the battery 110 may be a lithium polymer, a lithium-ion, a nickel metal hydride, a nickel cadmium, or other suitable battery type. In some other aspects, the battery 110 may be replaced by any technically feasible power source such as, for example, a power supply.

The load 130 may be any suitable component and/or sub-system within the device 100 that uses an electrical current. Example loads 130 may include a processor, a memory, a wireless transceiver, and/or a display (not shown for simplicity). In some aspects, load 130 may use a voltage that is a relatively higher voltage than may be provided by the battery 110. Under these conditions, the configurable boost converter 120 may generate an output voltage greater than the battery voltage for the load 130.

As the boost converter begins to supply an initial voltage to the load, an associated load capacitance may be relatively discharged. As will be described in greater detail below, the discharged load capacitance may unfavorably draw a relatively large pre-charge (initial) current that may stress one or more components in the boost converter and/or result in operation which is not inefficient. The excess current may damage and/or shorten the lifespan of these components. Certain embodiments described herein may reduce stress on boost converter components and/or increase efficiency, for example by limiting the pre-charge current provided by the boost converter.

Figure 2:
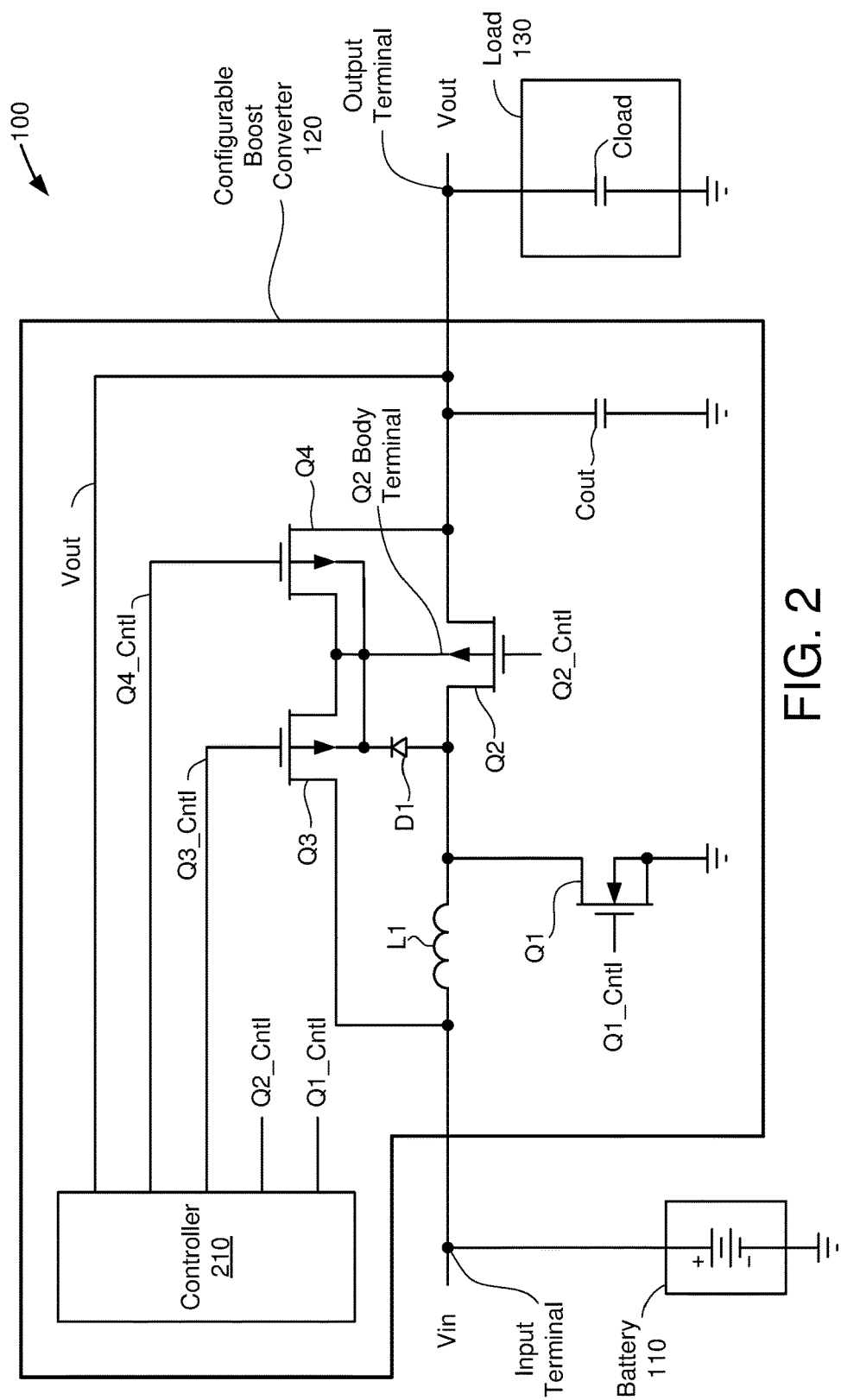
FIG. 2 is a simplified schematic drawing of an example embodiment of the device of FIG. 1.

FIG. 2 is a simplified schematic drawing of an example embodiment of the device 100 of FIG. 1. The configurable boost converter 120 receives an input voltage Vin from the battery 110 and generates an output voltage Vout for the load 130. In some aspects, the configurable boost converter 120 may receive the input voltage Vin via an input terminal and provide the output voltage Vout via an output terminal. The configurable boost converter 120 may include a controller 210, a first field effect transistor (FET) Q1, a second FET Q2, a third FET Q3 a fourth FET Q4, an inductor L1, a diode D1, and an output capacitor Cout. The inductor L1 may have first terminal coupled to the input terminal. The first FET Q1 may selectively couple and/or isolate or decouple a second terminal of the inductor to and/or from a ground reference (e.g., a relatively low voltage potential such a zero volts, often referred to as "ground"). The second FET Q2 may selectively couple and/or isolate or decouple the second terminal of the inductor to and/or from the output terminal. In some embodiments, such isolation includes the transistor being in a state in which substantially no current or a negligible amount or small subthreshold amount of current passes between a source and drain of the transistor. In some aspects, the configurable boost converter 120 may be a synchronous boost converter. Those skilled in the art will recognize that a synchronous boost converter may deliver the output voltage Vout to the load 130 by alternately storing energy in the inductor L1 via the first FET Q1 (sometimes referred to as a low-side FET) and then releasing the energy from the inductor L1 via the second FET Q2 (sometimes referred to as a high-side FET). Thus, the first FET Q1 may alternately couple then isolate the second terminal of the inductor L1 to the ground reference while the second FET Q2 alternately isolates then couples the second terminal of the inductor L1 to the output terminal. When operating in this fashion, the synchronous boost converter is said to be operating in a switching mode. The output capacitor Cout may store energy from the inductor L1 to smooth out energy delivery to the load 130. The controller 210 may be implemented within the configurable boost converter 120, as illustrated in FIG. 2. In other embodiments, the controller 210 is implemented separate and/or outside of the configurable boost converter 120. In some embodiments, the configurable boost converter 120 and the controller 210 are implemented in a power management integrated circuit (IC), for example within a mobile device. In some embodiments, the controller 210 or certain functions thereof may be implemented in another portion of the device or in separate controller.

When the second FET Q2 is enabled, current stored in the inductor L1 is coupled through the output terminal to the output capacitor Cout and/or the load 130. The second FET Q2 may include a body terminal (coupled to the body of the second FET Q2) that may be coupled to a voltage to prevent forward biasing of intrinsic diodes associated with the second FET Q2 (e.g., diode D1). In some aspects, the body terminal of the second FET Q2 may be coupled to an appropriate voltage via the third FET Q3 and/or the fourth FET Q4. For example, the third FET Q3 and the fourth FET Q4 may control the body terminal of the second FET Q2 by selectively coupling the body terminal to either Vin or Vout, respectively.

The load 130 may include a load capacitor represented schematically in FIG. 2 by capacitor Cload. In some aspects, the load capacitor Cload may be larger than the output capacitor Cout. When the load capacitor Cload is substantially discharged, such as when a current is first applied to the load 130, a large amount of initial (pre-charge) current (relative to an operating and/or switching current) may be needed to increase the voltage of the load capacitor Cload (and/or voltage of the output capacitor Cout) from a discharged voltage to a desired output voltage. The large amount of pre-charge current (sometimes referred to as inrush current) may damage one or more components of the configurable boost converter 120, such as the second FET Q2 and/or the inductor L1.

To limit the pre-charge current, the configurable boost converter 120 may operate in a pre-charging mode to provide a controlled amount of inrush current to the output capacitor Cout and/or the load capacitor Cload. In the pre-charging mode, the configurable boost converter 120 may cyclically (e.g., periodically) operate (e.g., enable) the second FET Q2 while maintaining the first FET Q1 in an off state. Thus, first FET Q1 may isolate the second terminal of the inductor from a ground reference while the second FET Q2 periodically couples and/or isolates the second terminal of the inductor to and/or from the output terminal of the boost converter. In some aspects, a control signal with a predetermined duty cycle may be provided to a gate of the second FET Q2 to periodically operate the second FET Q2 to control the pre-charge current through the inductor L1. The duty cycle of the control signal may determine "on" periods of the second FET Q2 and, therefore, how much pre-charge current may be drawn through the inductor L1. In some embodiments, the second FET Q2 may be periodically pulsed into an on state while the first FET Q1 is maintained in an off state.

The voltage of the load capacitance Cload and/or the output capacitor Cout may increase as pre-charge current is delivered through the second FET Q2. As the output voltage Vout approaches and/or exceeds a predetermined reference voltage Vref, the configurable boost converter 120 may transition from the pre-charging mode to the switching mode. In some embodiments, the controller 210 may be referred to as a boost converter controller and may monitor the output voltage Vout to determine when to transition from the pre-charging mode to the switching mode.

In some aspects, the third FET Q3 may be enabled during the pre-charging mode and the fourth FET Q4 may be enabled during the switching mode. In addition to coupling the body terminal of the second FET Q2 to an appropriate voltage, the third FET Q3 (when enabled) may provide a "freewheeling" path to reduce current through the inductor L1 by applying a reverse voltage across the inductor L1 during the pre-charging mode.

The controller 210 may control operation of the configurable boost converter 120 by supplying control signals to the first FET Q1, the second FET Q2, the third FET Q3, and the fourth FET Q4. In some aspects, the controller 210 may monitor the output voltage Vout, and supply the control signals to the FETs Q1-Q4 accordingly. For example, if the output voltage Vout is less than the reference voltage Vref, then the controller 210 may operate the configurable boost converter 120 in the pre-charging mode. In this mode, the controller 210 may provide a Q1_Cntl signal to a gate of the first FET Q1 to place the first FET Q1 in the off state. In addition, the controller 210 may provide a Q2_Cntl to a gate of the second FET Q2 to periodically operate the second FET Q2. In some embodiments, the Q2_Cntl signal may be a square wave signal with a predetermined duty cycle to periodically operate the second FET Q2.

Alternatively, or in addition to controlling the configurable boost converter 120 by monitoring the output voltage Vout, the controller 210 may control the configurable boost converter 120 based on a timer (not shown for simplicity). For example, when the device 100 is powered on for the first time, the timer may be initialized and the controller 210 may operate the configurable boost converter 120 in the pre-charging mode. After the timer exceeds a pre-determined time and/or value and/or number of cycles of the Q2_Cntl signal, the controller 210 may operate the configurable boost converter 120 in the switching mode.

Furthermore, when operating in the pre-charging mode, the controller 210 may provide a Q3_cntl signal to a gate of the third FET Q3 to enable (e.g., turn on) the third FET Q3 and couple the body terminal of the second FET Q2 to the input voltage Vin. The controller 210 may provide a Q4_Cntl signal to a gate of the fourth FET Q4 to disable (e.g., turn off) the fourth FET Q4.

On the other hand, if the output voltage Vout is greater than or equal to the reference voltage Vref, then the controller 210 may operate the configurable boost converter 120 in the switching mode. In this mode, the controller 210 may provide the Q1_Cntl signal to the gate of the first FET Q1 and the Q2_Cntl signal to the gate of the second FET Q2 to alternately operate the first FET Q1 and the second FET Q2. In this manner, the first FET Q1 may store energy in the inductor L1 and the second FET Q2 may release energy from the inductor L1 to the load 130. In some aspects, the Q1_Cntl signal and the Q2_Cntl signal may be square waves with a varying duty cycle to maintain a desired output voltage Vout.

Furthermore, when operating in the switching mode, the controller 210 may provide the Q4_cntl signal to a gate of the fourth FET Q4 to enable (e.g., turn on) the fourth FET Q4 and couple the body terminal of the second FET Q2 to the output voltage Vout. The controller 210 may provide the Q3_cntl signal to the gate of the third FET Q3 to disable (e.g., turn off) the third FET Q3.

In some aspects, hysteresis may be applied to the reference voltage Vref to reduce the likelihood of the configurable boost converter 120 from switching back and forth between the pre-charging mode and the switching mode in an undesired manner. Also, in the example configurable boost converter 120 of FIG. 2, the first FET Q1 is depicted as a NMOS FET and the second FET Q2, the third FET Q3, and the fourth FET Q4 are depicted as PMOS FETs. In other embodiments, the FETs of the configurable boost converter 120 may be any suitable type of FET and/or transistor. Table 1 below summarizes FET operation of the configurable boost converter 120 with respect to the output voltage Vout in one embodiment.

TABLE 1

| Vout | Mode | FET Q1 | FET Q2 | FET Q3 | FET Q4 |
|---|---|---|---|---|---|
| Less than Vref | Pre-charging | Off | Periodically Enabled | Enabled | Off |
| Greater than or equal to Vref | Switching | Alternately enable FET Q1 and FET Q2 | | Off | Enabled |

Figure 3:
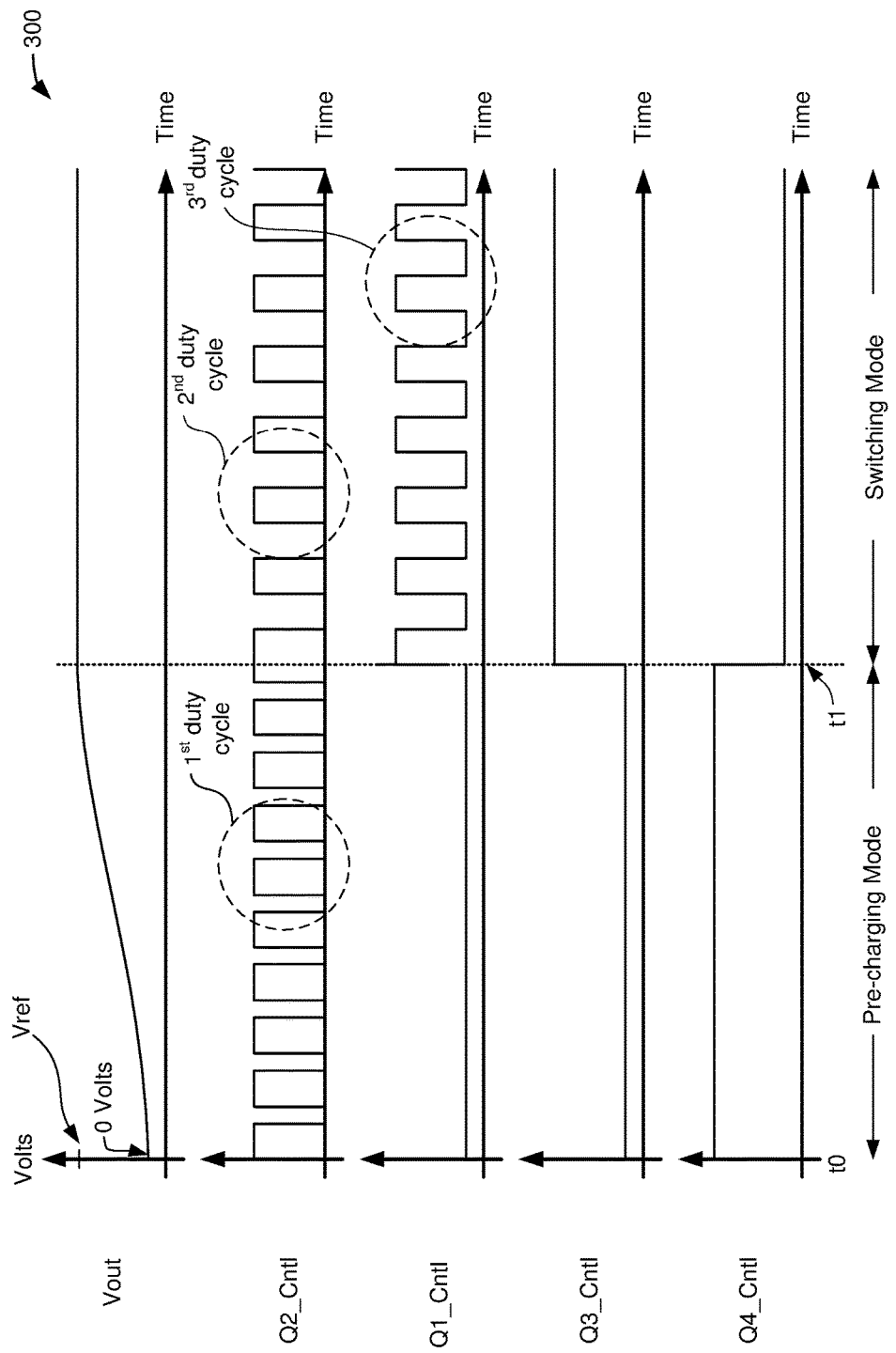
FIG. 3 shows a waveform diagram of control signals described with respect to FIG. 2

FIG. 3 shows a waveform diagram 300 illustrating control signals provided by the controller 210 of FIG. 2 with respect to time, in accordance with some embodiments. As described above with respect to FIG. 2, the output voltage Vout may determine, at least in part, the operation of the configurable boost converter 120. As shown in the waveform diagram 300, at time=t0, the output voltage Vout may be less than the reference voltage Vref. Thus, the controller 210 may operate the configurable boost converter 120 in the pre-charging mode.

In the pre-charging mode, the controller 210 may generate a square wave having a first duty cycle for the Q2_Cntl signal to periodically enable the second FET Q2. The first duty cycle may determine, at least in part, the pre-charge current by determining the operating time of the second FET Q2 (e.g., percentage of time that the second FET Q2 conducts current) and therefore the pre-charge current drawn through the inductor L1. Note that the second FET Q2 may be enabled by high voltage levels or low voltage levels of the Q2_Cntl signal depending on the configuration of the second FET Q2 (e.g., NMOS, PMOS, depletion, and/or enhancement).

The controller 210 may also generate a relatively static Q1_Cntl signal to disable the first FET Q1 during the pre-charging mode. In the example of FIG. 3, the Q1_Cntl signal is depicted as static a low level. The low level of the Q1_Cntl signal is meant to illustrate any suitable voltage level to disable the first FET Q1. In a similar manner, the controller 210 may generate a relatively static Q3_Cntl signal and Q4_Cntl signal to enable the third FET Q3 and disable the fourth FET Q4, respectively.

The output voltage Vout increases as the pre-charge current is provided to the output capacitor Cout and/or the load capacitor Cload during the pre-charging mode. After the controller 210 determines that the output voltage Vout is greater than or equal to the reference voltage Vref (at or near time=t1 in FIG. 3), the configurable boost converter 120 transitions to the switching mode.

In the switching mode, the controller 210 may generate a Q1_Cntl signal and a Q2_Cntl signal to alternatively enable the first FET Q1 and the second FET Q2. When the first FET Q1 is enabled and the second FET Q2 is disabled, energy may be stored in the inductor L1. When the first FET Q1 is disabled and the second FET Q2 is enabled, energy from the inductor L1 may be released to the load 130. The Q2_Cntl signal may be generated as a square wave having a second duty cycle and the Q1_Cntl signal may be generated as a square wave having a third duty cycle. In some aspects, the second duty cycle and the third duty cycle may be controlled (e.g., modulated) to maintain a desired output voltage Vout. The second duty cycle and the third duty cycle may each be different from the first duty cycle and may also be different with respect to each other. In some embodiments, however, the second duty cycle and the third duty cycle are approximately equal and/or are equal to the first duty cycle. The controller 210 may generate a relatively static Q3_Cntl signal and Q4_Cntl signal to disable the third FET Q3 and enable the fourth FET Q4, respectively.

Figure 4:
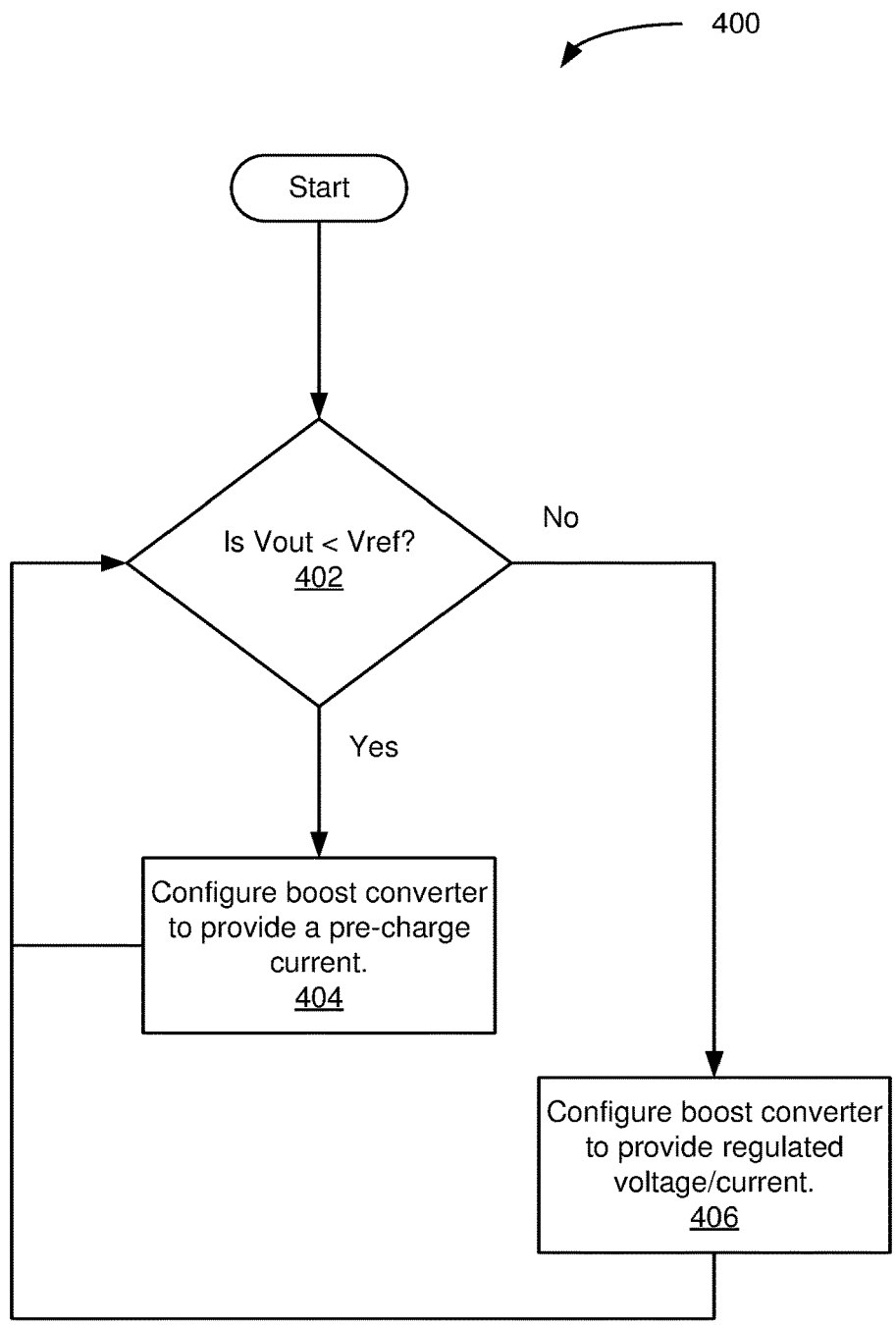
FIG. 4 shows an illustrative flow chart depicting an example operation for operating the configurable boost converter of FIG. 1, FIG. 2, and/or FIG. 5, in accordance with some embodiments.
Figure 5:
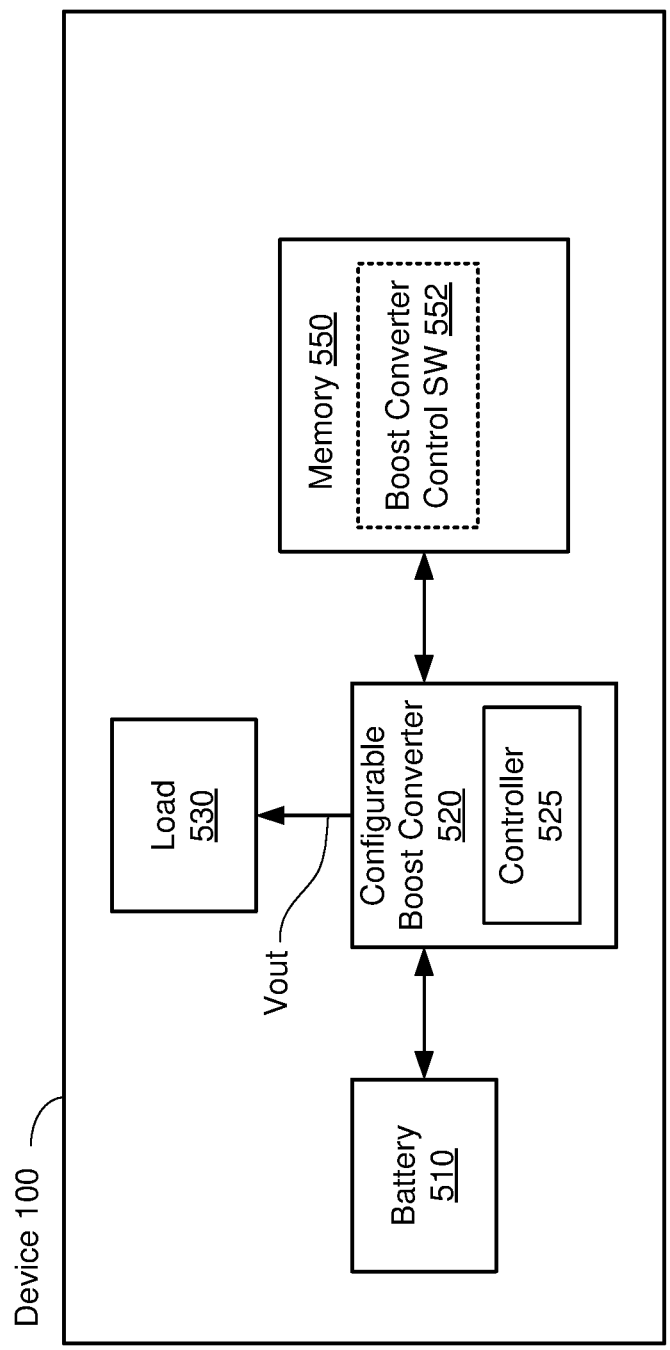
FIG. 5 shows a block diagram of another example embodiment of the portable device of FIG. 1.

FIG. 4 shows an illustrative flow chart depicting an example operation 400 for operating the configurable boost converter 120 of FIG. 1 and FIG. 2, and/or the configurable boost converter 520 of FIG. 5, in accordance with some embodiments. Some embodiments may perform the operations described herein with additional operations, fewer operations, operations in a different order, operations in parallel, and/or some operations differently. Referring also to FIGS. 1 and 2, the controller 210 determines if the output voltage Vout is less than the reference voltage Vref (402). If the output voltage Vout is less than the reference voltage Vref, then the controller 210 configures the configurable boost converter 120 to provide a pre-charge current to the output capacitor Cout and/or the load capacitor Cload (404). In some aspects, the controller 210 may generate control signals to disable the first FET Q1 (e.g., a low-side FET) while periodically enabling the second FET Q2, (e.g., a high-side FET) to provide a controlled amount of pre-charge current through the inductor L1 of the configurable boost converter 120. The controller 210 may also generate control signals to couple the body terminal of the second FET Q2 to an appropriate voltage to prevent unintended forward biasing of associated diodes. The operation then reverts to 402.

If the output voltage Vout is greater than the reference voltage Vref (as tested in 402), then the controller 210 configures the configurable boost converter 120 to provide a regulated voltage and/or current to the output capacitor Cout and/or the load capacitor Cload (406). In some aspects, the controller 210 may generate control signals to alternately enable and disable the first FET Q1 and the second FET Q2 to store and release energy via the inductor L1. The controller 210 may also generate control signals to couple the body terminal of the second FET Q2 to an appropriate voltage to prevent unintended forward biasing of associated diodes. The operation then reverts to 402.

FIG. 5 shows a block diagram of an embodiment of the device 100 of FIGS. 1 and 2. The device 100 may include a battery 510, a configurable boost converter 520, a load 530, and a memory 550. The battery 510, the configurable boost converter 520, and the load 530 may be embodiments of the battery 110, the configurable boost converter 120, and the load 130 of FIGS. 1 and 2.

The configurable boost converter 520 may be coupled to the battery 510 and the load 530. The configurable boost converter 520 may provide a regulated voltage and/or current to the load 530. The configurable boost converter 520 may include a controller 525. The controller 525 may be an embodiment of the controller 210 of FIG. 2. In some aspects, the controller 525 may be implemented as a general purpose processor, a state machine, discrete circuits, or any other technically feasible manner. For example, the controller may be any one or more suitable processors capable of executing scripts or instructions of one or more software programs store in the device 100 (such as within memory 550). In some aspects, the configurable boost converter 520 may also provide a determined pre-charge current to the load 530 based, at least in part, on the output voltage Vout.

The memory 550 may include a non-transitory computer-readable storage medium (e.g., one or more nonvolatile memory elements, such as EPROM, EEPROM, Flash memory, a hard drive, etc.) that may store the following software modules:

a boost converter control software (SW) module 552 to control the configurable boost converter 520.

Each software module includes program instructions that, when executed by the controller 525, may cause the device 100 to perform the corresponding function(s). Thus, the non-transitory computer-readable storage medium of memory 550 may include instructions for performing all or a portion of the operations of FIG. 4.

Controller 525 may execute the boost converter control SW module 552 to direct the configurable boost converter 520 to provide a pre-charge current and/or provide a pre-determined output voltage. In some embodiments, executing the boost converter control SW module 552 may configure the configurable boost converter 520 to generate a pre-charge current when the output voltage is less than a reference voltage Vref or generate a regulated output voltage when the output voltage is greater than or equal to the reference voltage Vref. In some aspects, executing the boost converter control SW module 552 may also control a body voltage terminal of one or more FETs within the configurable boost converter 520.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A boost converter comprising:
   an inductor comprising a first terminal and a second terminal, wherein the first terminal is coupled to an input terminal of the boost converter;
   a first field effect transistor (FET) configured to selectively couple a second terminal of the inductor to a ground reference;
   a second field effect transistor (FET) configured to selectively couple the second terminal of the inductor to an output terminal of the boost converter; and
   a controller configured to:
      determine an output voltage of the boost converter; and
      in response to the output voltage of the boost converter being less than a reference voltage, control the first FET to continually decouple the second terminal of the inductor from the ground reference and control the second FET to periodically decouple the second terminal of the inductor from the output terminal via a control signal with a first duty cycle, and
      in response to the output voltage of the boost converter being not less than the reference voltage, control the first FET to alternately couple and isolate the second terminal of the inductor from the ground reference and control the second FET to alternately isolate and couple the second terminal of the inductor to the output terminal.

2. The boost converter of claim 1, wherein the control signal for the second FET is provided to a gate of the second FET.

3. The boost converter of claim 1, wherein the controller is configured to control the first FET and the second FET to alternately decouple the second terminal of the inductor from the ground reference and from the output terminal of the boost converter when an output voltage of the boost converter is not less than a reference voltage.

4. The boost converter of claim 3, wherein the controller is configured to use a first control signal having a second duty cycle for controlling the first FET and a second control signal having a third duty cycle for controlling the second FET.

5. The boost converter of claim 1, wherein the controller is configured to couple a body of the second FET to the first terminal of the inductor if an output voltage of the boost converter is less than a reference voltage.

6. The boost converter of claim 5, wherein the controller is configured to couple the body of the second FET to an output terminal of the boost converter if the output voltage is greater than a reference voltage.

7. A method for operating a boost converter, the method comprising:
   controlling, by a boost converter controller, a first field effect transistor (FET) to:
      continually decouple a second terminal of an inductor from a ground reference in response to an output voltage of the boost converter being less than a reference voltage, and
      alternately couple and isolate the second terminal of the inductor from the ground reference in response to the output voltage of the boost converter being not less than the reference voltage, wherein a first terminal of the inductor is coupled to an input terminal of the boost converter; and
   controlling, by the boost converter controller, a second field effect transistor (FET) using a control signal with a first duty cycle to:
      periodically isolate the second terminal of the inductor from an output terminal of the boost converter in response to the output voltage of the boost converter being less than the reference voltage, and
      alternately isolate and couple the second terminal of the inductor from the output terminal of the boost converter in response to the output voltage of the boost converter being not less than the reference voltage.

8. The method of claim 7, wherein the control signal is provided to a gate of the second FET.

9. The method of claim 7, further comprising:
   in response to the output voltage of the boost converter being not less than the reference voltage, generating a first control signal with a second duty cycle to control the first FET and generating a second control signal with a third duty cycle to control the second FET.

10. A device comprising:
    a battery;
    a load; and a boost converter coupled to the battery and to the load, the boost converter comprising:

an inductor comprising a first terminal and a second terminal, wherein the first terminal is coupled to the battery;

a first field effect transistor (FET) configured to selectively isolate the second terminal of the inductor from a ground reference;

a second field effect transistor (FET) configured to selectively isolate the second terminal of the inductor from the load; and a controller configured to:

in response to an output voltage of the boost converter being less than a reference voltage, control the second FET using a control signal with a first duty cycle to periodically decouple the second terminal of the inductor from the load while causing the first FET to maintain continual isolation of the second terminal of the inductor from the ground reference, and in response to the output voltage of the boost converter being not less than the reference voltage, control the second FET to alternately isolate and couple the second terminal of the inductor to the load and control the first FET to alternately couple and isolate the second terminal of the inductor to the ground reference.

11. The device of claim 10, wherein the second terminal of the inductor is periodically isolated from the load by the second FET during a pre-charge mode.

12. A boost converter comprising:

means for controlling a first field effect transistor (FET) to:

continually decouple a second terminal of an inductor from a ground reference in response to an output voltage of the boost converter being less than a reference voltage, and alternately couple and isolate the second terminal of the inductor from the ground reference in response to the output voltage of the boost converter being not less than the reference voltage, wherein a first terminal of the inductor is coupled to an input terminal of the boost converter; and means for controlling a second field effect transistor (FET) using a control signal with a first duty cycle to:

periodically decouple the second terminal of the inductor from an output terminal of the boost converter in response to the output voltage of the boost converter being less than the reference voltage, and alternately isolate and couple the second terminal of the inductor from the output terminal of the boost converter in response to the output voltage of the boost converter being not less than the reference voltage.

* * * * *